April 3, 1962   E. D. CONKLIN ETAL   3,027,717
GAS TURBINE
Original Filed Jan. 13, 1954   4 Sheets-Sheet 1

Inventors
James M. Ricketts,
Emmett D. Conklin,
Eugene E. Flanigan, &
William O. Turunen
BY Paul Fitzpatrick
Attorney April 3, 1962  E. D. CONKLIN ETAL  3,027,717
GAS TURBINE Original Filed Jan. 13, 1954  4 Sheets-Sheet 4

Inventors
James M. Ricketts,
Emmett D. Conklin,
Eugene E. Hanigan, &
William A. Turunen BY Paul Fitzpatrick
Attorney

United States Patent Office 3,027,717
Patented Apr. 3, 1962

3,027,717
GAS TURBINE
Emmett D. Conklin, Warren, Eugene E. Flanigan, Detroit, James M. Ricketts, Oxford, and William A. Turunen, Birmingham, Mich., assignors to General Motors Corporation, Detroit, Mich., a corporation of Delaware
Original application Jan. 13, 1954, Ser. No. 403,824, now Patent No. 2,972,230, dated Feb. 21, 1961. Divided and this application Jan. 28, 1959, Ser. No. 789,705
3 Claims. (Cl. 60—39.65)

This application is a division of application Serial No. 403,824, filed January 13, 1954 (Patent No. 2,972,230).

This invention relates to a power plant of the gas turbine type. The principal object of the invention is to provide a superior gas turbine power plant installation particularly suitable for automobiles.

More specifically, objects of the invention are to provide a compact gas turbine engine and to provide a novel and improved arrangement of compressor and combustion chamber in a gas turbine.

The preferred embodiment of the invention is in a gas turbine engine comprising a centrifugal compressor, combustion chambers supplied thereby, a first turbine powered by combustion products from the combustion chambers and coupled to the compressor, and a second turbine driving a power output shaft which is coupled through suitable power transmission gearing to the drive wheels of the car. The nature and advantages of the novel structures according to the invention will be more clearly apparent from the succeeding detailed description and the accompanying drawings, in which.

Figure 1:
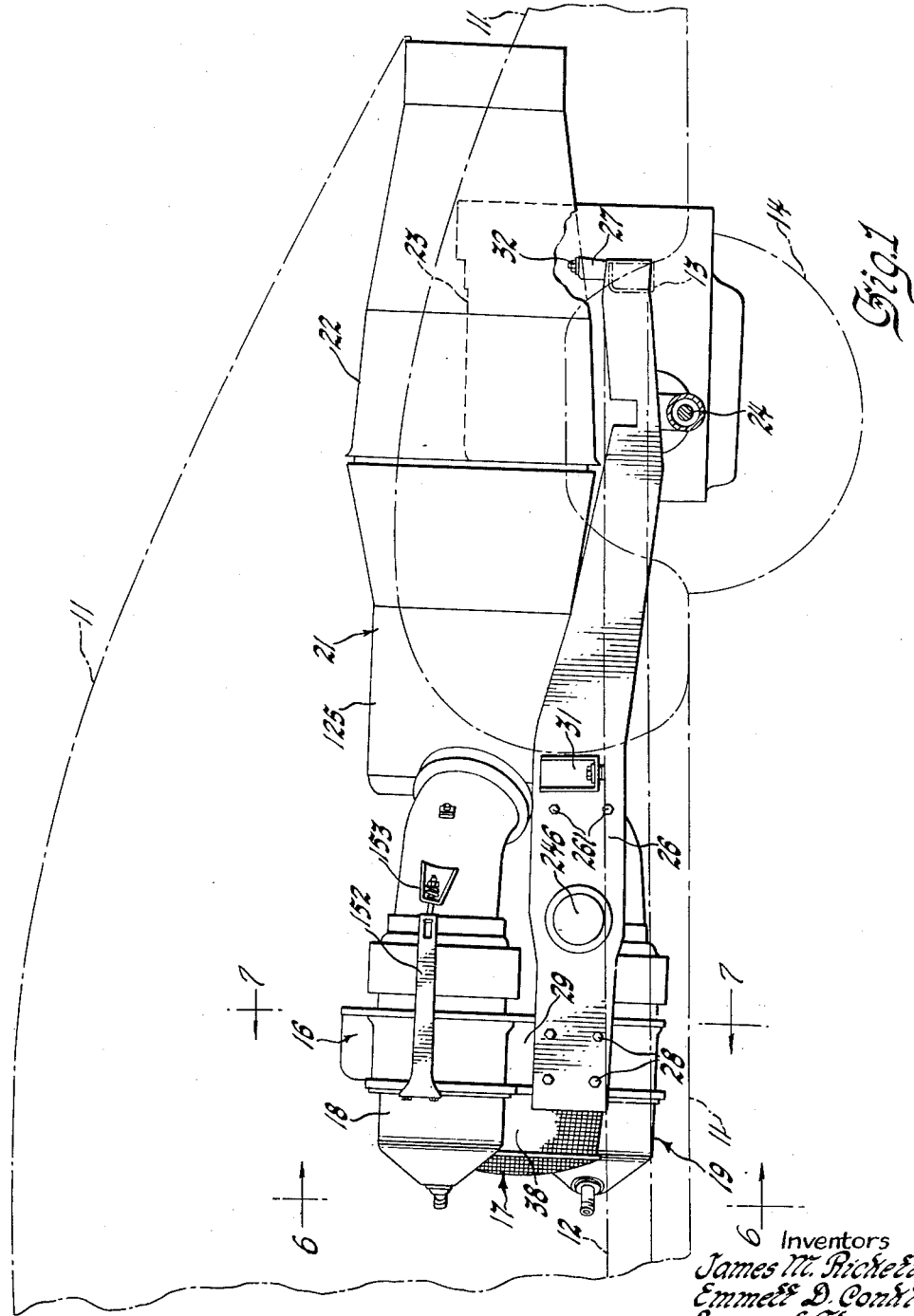
FIG. 1 is an elevation view of an automobile turbine installation, the outline of the automobile being indicated by broken lines.
Figure 2:
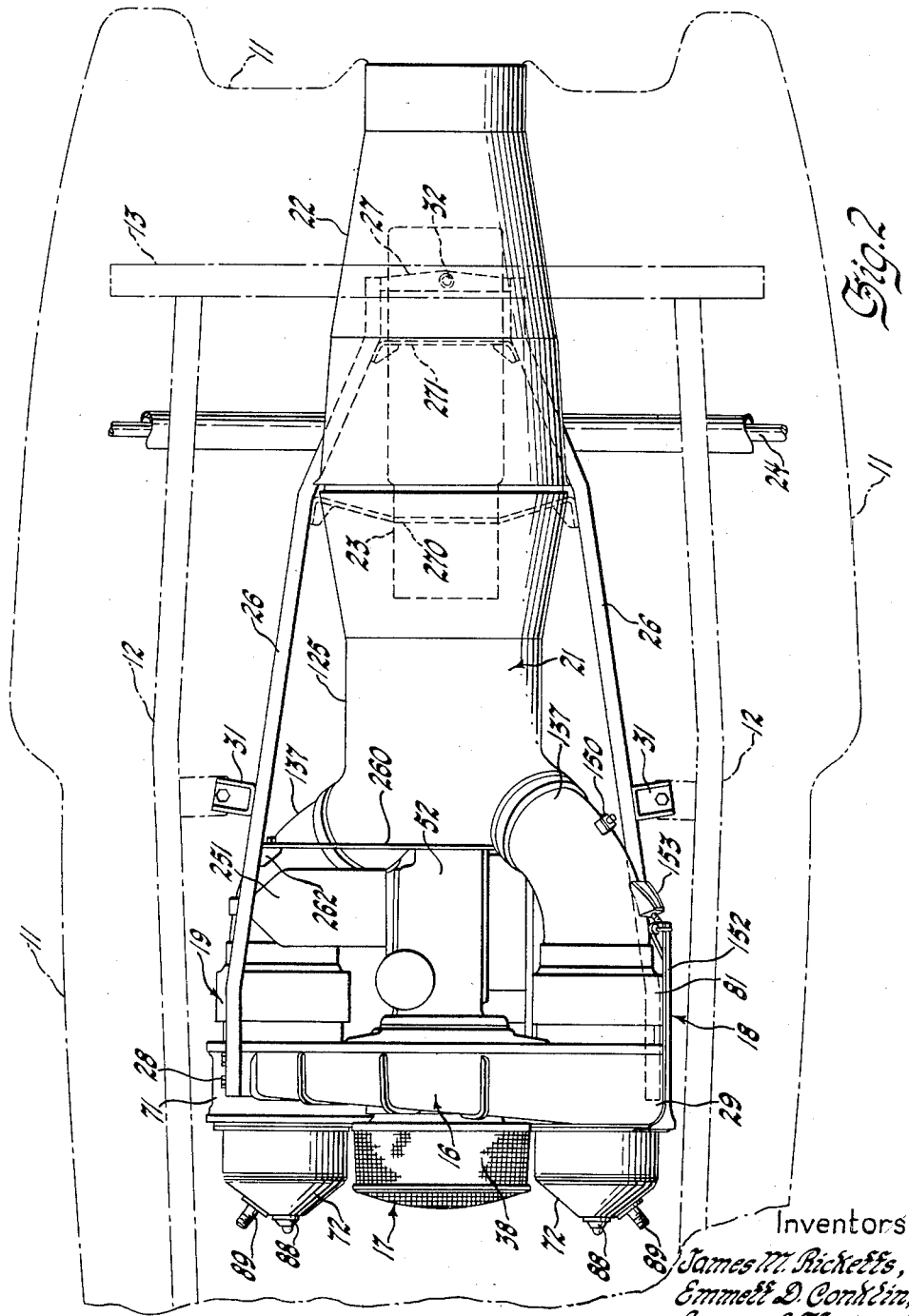
FIG. 2 is a plan view of the same.
Figure 3:
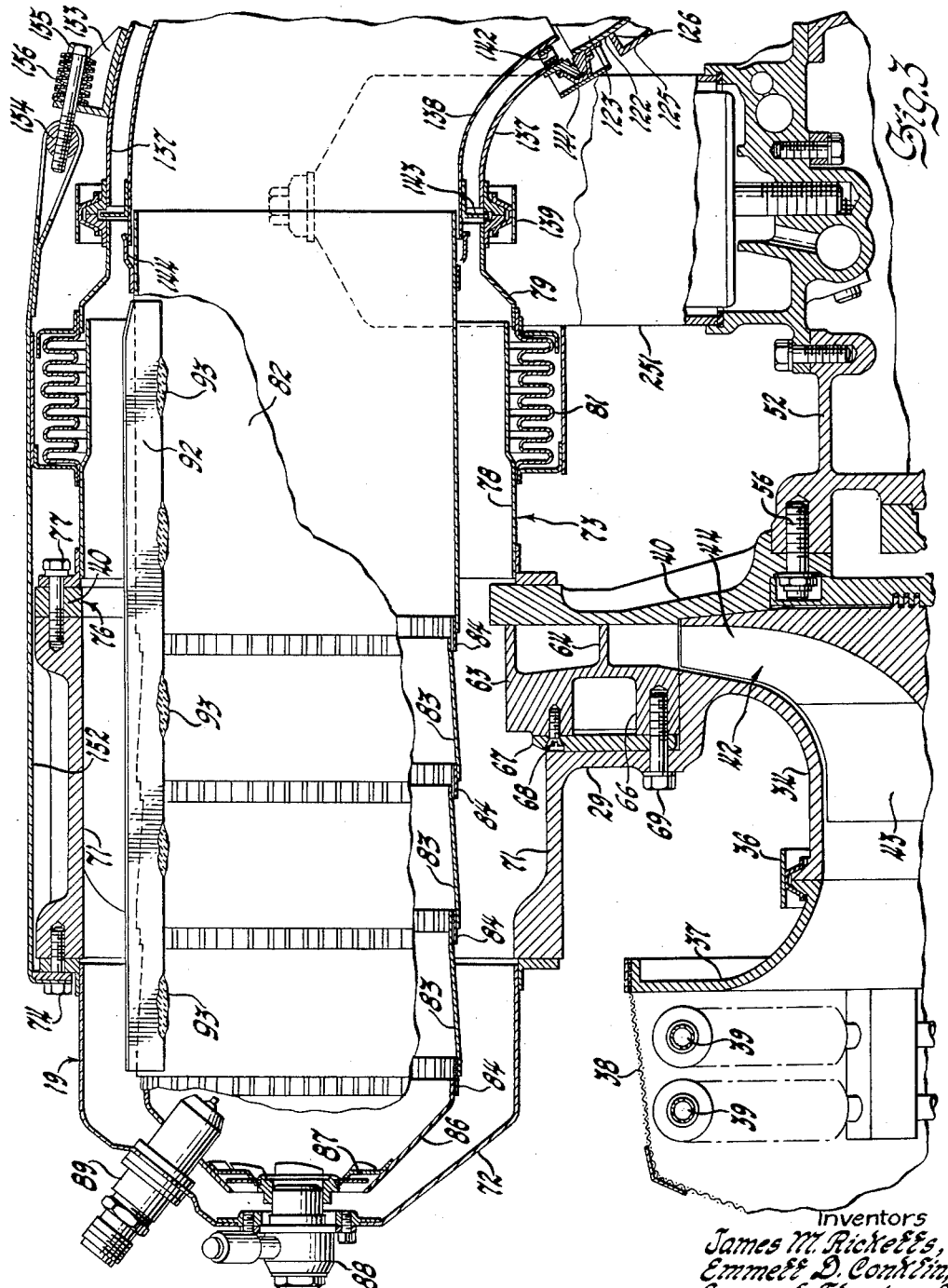
FIG. 3 is a sectional view taken on a plane containing the axis of the engine, showing principally the combustion chamber.
Figure 4:
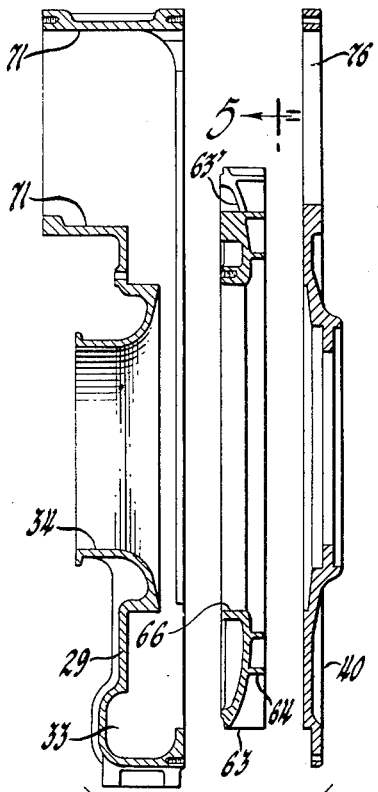
FIG. 4 is an exploded view of the compressor case and diffuser.
Figure 5:
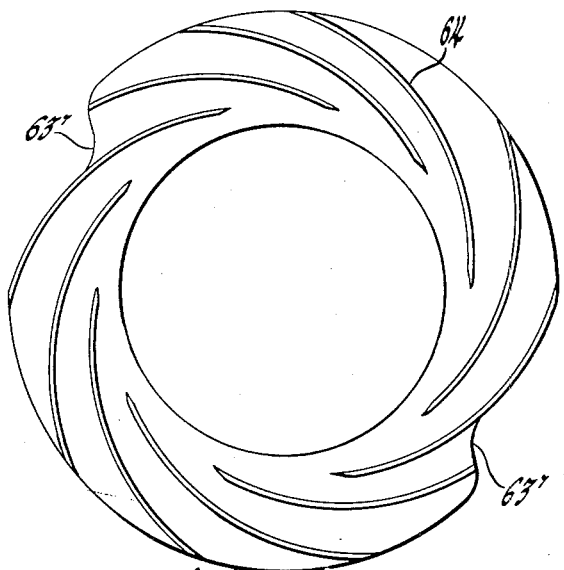
FIG. 5 is an elevation view of the diffuser taken on the plane indicated in FIG. 4.
Figure 6:
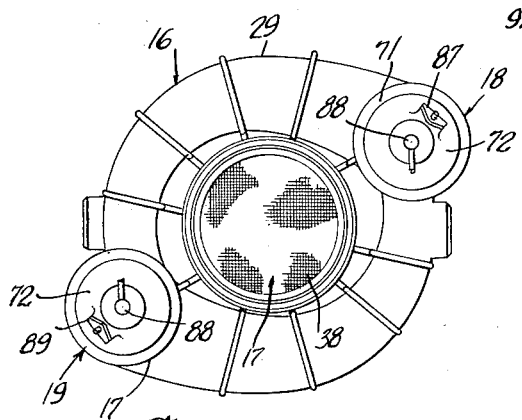
FIGURE 6 is a front elevation view of the engine taken on the plane indicated by the line 6—6 in FIGURE 1.
Figure 7:
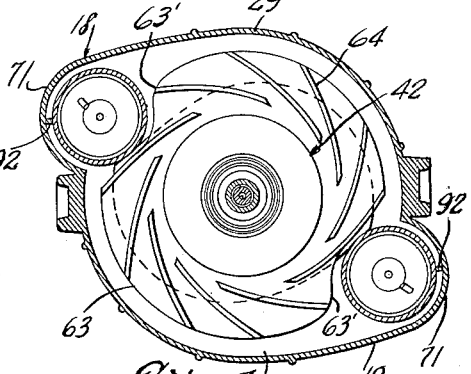
FIGURE 7 is a cross section of the engine taken on the plane indicated by the line 7—7 of FIGURE 1.

Referring first to FIGS. 1 and 2, these illustrate the installation of an engine according to the invention at the rear end of an automobile, the body of which is immaterial and may be considered as indicated in outline by the broken lines 11. The car includes longitudinal frame members 12 and a rear frame cross member 13. The frame may be conventional. The rear wheels are indicated at 14. The rear suspension and drive are of a de Dion type, the details of which are immaterial to this invention.

The engine, transmission, and differential gear constitute an assembly which may be mounted in the vehicle as a unit and which comprises, in general terms, a radial-flow compressor 16 receiving air through an inlet 17 and discharging it into combustion chambers 18 and 19 from which it flows through turbine wheels mounted within a casing 21. The exhaust gases are discharged through a pipe 22 to the rear end of the vehicle. This pipe is of saddle shaped contour at the forward end and overlies a transmission 23 which includes speed reduction and reverse gears and a differential gear through which the half shafts 24 of the rear wheels 14 are driven. The compressor, combustion chambers, turbine, transmission, and exhaust pipe are mounted on a subframe which comprises a rail 26 at each side of the power plant and a cross member 27 at the rear. The front ends of the rails 26 are bolted at 28 to the outer case or air collector scroll 29 of the compressor. The entire power plant assembly is supported on the chassis frame 12, 13 of the vehicle at three points. Brackets 31 extending from the rails 26 are mounted by conventional shock absorbing supports on pads on the frame. The rear cross member 27 is mounted by bolt 32 and a shock absorbing mount to a pad on the rear frame cross member 13. By virtue of the three point mounting of the power plant and the de Dion type rear axle, the power plant is easily installed and removed and is not affected by distortions of the chassis or movements of the rear wheels.

The details of the power plant will be clearer after general discussion of the engine structure. Referring additionally to FIGS. 3 to 7, it will be seen that the compressor case 29 defines not only the collector chamber or scroll 33 but also the forward cover of the compressor and the air inlet portion 34 which is coupled by a V band clamp 36 to a flaring air entrance duct 37 on the front of which is mounted a screen 38. An engine oil cooling radiator 39 is mounted in the path of air entering the engine. The compressor case is completed by a back plate 40 bolted to the front plate 29 by studs and nuts (not illustrated) and bolts 77.

A centrifugal compressor rotor 42, which may be of known type comprising an inducer or entry portion 43 and an impeller or discharge portion 44, is mounted on a main shaft (not illustrated) supported in an engine frame or drive shaft housing 52, extending between the compressor and turbine. The housing or frame 52 is fixed to the compressor case rear plate 40 by studs including studs 56.

Air discharged from the compressor rotor 42 flows into a diffuser 63 which comprises a unitary member defining a plate curving away from the back plate 40 toward the outer margin and spiral ribs 64 thereon which act as guide vanes for the discharged air. The plate 63 has a flange 66 at the inner edge which is piloted on the case 29. A disk or annular plate 67 is fixed to the forward face of the diffuser 63 by screws 68 and this entire assembly is held on the case 29 by bolts 69.

The air collector scroll comprises two circumferentially enlarging portions of approximately 180° extent, each of which discharges into one of the combustion chambers 18 and 19. The compressor case is formed at points 180° apart with cylindrical portions 71, the axes of which are parallel to the compressor axis. These cylindrical portions 71 define the intermediate part of the two combustion chambers, each of which also comprises a forward shell 72 and a rear shell 73 aligned with the cylinder 71. The forward shell 72 is integral with a flange secured to the forward face of the cylinder 71 by bolts 74. The compressor rear plate 40 is also formed with two circular openings 76 which register with the cylindrical portions 71. A flange on the rear shell 73 is fixed to the case 29 by bolts 77 passing through the rear plate 40 into the cylindrical portion 71, which constitute part of the means by which the compressor casing parts 29 and 40 are held together.

The rear combustion chamber shell 73 comprises two generally cylindrical parts 78 and 79 connected by a bellows type expansion joint 81 of known type to provide for thermal expansion. Combustion takes place within the combustion chamber 18 in a flame tube or combustion liner 82 which is comprised of a number of sections 83 united by corrugated strips 84 welded to the sections and a forward cap or dome 86. The parts 82 and 83 may, of course, be provided with openings for admission of air in a suitable pattern, which are not illustrated. Air also enters the forward end of dome 86 through a swirler 87. A fuel nozzle 88, the internal structure of which is immaterial to the invention, is bolted to the forward end of shell 72 and piloted within the swirler 87, providing a support for the forward end of the flame tube.

An igniter or spark plug 89, which may be of known type and the structure of which is also immaterial to the invention, is mounted in the shell 72 and extends through the dome 86.

As appears most clearly in FIG. 2, each half of the collector scroll portion of the compressor case 29 increases in width circumferentially of the engine and it also increases slightly in its radial dimension circumferentially of the engine so as to increase in cross section toward each of the combustion chambers into which it discharges. The cylindrical portion 71 which constitutes a part of the combustion chamber also constitutes a termination of the particular half circumference of the collector. The extreme distance of this portion from the axis of the engine is but very slightly greater than the radius of the beginning portion from the axis as will be apparent from the slight amount to which the parts 71 project outside the forward end of the frame rails 26.

By mounting the combustion chamber into the diffuser as is done in this engine instead of completing the diffusion of the air and then turning the air into an outlet which discharges it into the combustion chamber, a far more compact structure than that of conventional engines is achieved. In other words, the necessary diameter of the compressor diffuser and collector substantially determines the diameter of the engine. As will be apparent from FIG. 5, the diffuser plate 63 is slightly notched at the margin at 63' to provide clearance for the combustion chamber liner so that the liner is as close to the axis of the engine as is consistent with proper diffusion and discharge of air.

The discharge of air into the mid-portion of the combustion chamber allows the combustion chamber to project forwardly to approximately the same plane as the air inlet and brings the turbine close to the compressor, making possible a short rigid main shaft connecting the compressor and turbine, which is another important advantage of the construction according to the invention.

With the compressor-diffuser combustion chamber arrangement of the invention, some difficulty was experienced with combustion which was found to be the result of swirl of air circumferentially around the combustion chamber liner which interfered with proper flow patterns through the combustion chamber liner. This problem was solved by providing a baffle extending longitudinally of the liner and substantially from the wall of the flame tube to the wall of the combustion chamber. This baffle constitutes a strip 92 of sheet metal welded as indicated at 93 to each of the sections of the combustion chamber. The preferred position for this strip is approximately at the middle of the leeward side of the liner with respect to the position of the air inlet to the combustion chamber. However, in the view of FIG. 3, it is shown rotated some 45° above this position so as to show more clearly. With the baffle thus mounted, the air entering the combustion chamber divides and flows around each side of the liner and toward each end of the liner and the flow into the liner is quite satisfactory.

Details of the turbines, shafts therefor, etc., immaterial to the invention of this application are omitted in the interest of conciseness. Reference may be made to the parent application Patent No. 2,972,230, for such details.

The turbine inlet casing or scroll 122 defines two openings 123 at opposite sides of the engine axis to receive the combustion products. The scroll 122 is mounted within the forward end of an outer turbine case of heat shield 125 which has flanged openings 126 abutting the entrance portions 123 of the scroll.

Combustion products are conducted from the combustion chamber into the inlets 123 to the turbine through concentric inner and outer ducts or elbows 137 and 138. The outer conduit 137 is provided with flanges which are secured to the parts 79 of the combustion chamber by V band clamp 139, and similarly to the turbine inlet 123 by clamp 141. The liner 138 is spaced from the outer conduit 137 at its discharge end by sheet metal spacers 142 and at its forward end by a flange 143 on the elbow which extends into a recess between the flanges on the parts 79 and 137 for location. The rear end of the combustion liner 82 is telescoped within the forward end of the discharge elbow 138 and is provided with a flange 144 which engages the outer surface of the elbow to align the two parts. It will be apparent that this sliding joint provides for relative expansion of the parts.

Combustion chamber temperature is measured by a thermocouple 150 mounted in any suitable manner in the elbow 137 and projecting through an opening in the liner 138. The structure of the thermocouple and the details of the mounting are immaterial to the present invention.

The outer wall of the combustion chamber is not constituted to resist the pressure exerted against the ends by the air within the chamber because of the thermal expansion joint 81. This pressure, therefore, tends to distort the turbine nozzle because the combustion chambers exert forces of considerable magnitude along an axis outboard of the nozzle. These forces are compensated for in large measure while retaining the ability of the combustion chamber to adjust to thermal conditions by an arrangement comprising a strap 152 fixed by bolts 74 to the forward end of the portion 71 of the compressor case and coupled to a bracket 153 welded to the elbow 137. The rear end of the strap is looped around a rod 154 through which a bolt 155 is threaded. A stack 156 of Belleville washers is compressed between the head of the bolt 155 and the flange of the bracket so as to pull on the strap 152. The expansion of the combustion chambers can be accommodated by compression of springs 156 and, if desired, these springs may have a very low rate so that the tension varies little with the movement.

An oil filter 251 is mounted on the engine case 52, the nature of the filter and its connection into the lubrication system being immaterial to the present invention.

The principal support of the gas generator is the bolting of the compressor case 29 to the front end of the rails at 28 as shown in FIG. 1. In addition, a relatively thin deep plate 260 extends between the rails over the outlet of combustion chamber 19 and under the outlet of combustion chamber 18. This plate is fixed to the rear end of the accessory gear case 52 immediately ahead of the turbine. The plate 260 is fixed to the side rails by bolts 261 (FIG. 1) through angle brackets 262. The plate is rigid in a vertical direction but flexible fore and aft so that it can bow slightly to accommodate expansion due to heat.

The transmission 23 is supported by plates 270 and 271 which are similar to the plate 260 and extend from one rail to the other. The plate 271 is sufficiently stiff to resist any fore and aft movement of the transmission, while the plate 270 is relatively flexible in the fore and aft direction. Both of these plates are of deep enough section to resist any vertical movement of the transmission, or rotation thereof about a longitudinal axis. It will be seen, therefore, that all the parts of the power plant are supported on the subframe in a simple and efficient manner providing for relative movement as necessary and preventing any undesired movement of the parts.

The entire installation is particularly suited for automobile purposes because of the power characteristics of the gas coupled turbine and because of the compactness and ease of installation of the power plant.

The detailed description herein of the preferred embodiment of the invention is not to be construed as limiting the scope of the invention.

We claim:

1. A gas turbine engine comprising, in combination, a radial-flow compressor having an axis and including a compressor casing defining a vaned diffuser and an air collector scroll, a generally cylindrical combustion case supplied with air from the collector scroll, the outer boundaries of the scroll and case relative to the axis being closely adjacent and the case extending axially in both directions from the scroll, the case being defined by the compressor casing and shells mounted on and extending from each face of the casing, and a combustion liner having a fuel inlet at one end thereof and a combustion products outlet at the other end thereof mounted within the case and extending axially in both directions from the scroll, the scroll discharging into the case through an air inlet directed transversely to said axis intermediate the ends of the liner.

2. A gas turbine engine comprising, in combination, a radial-flow compressor having an axis and including a compressor casing defining a vaned diffuser and an air collector scroll, a generally cylindrical combustion case supplied with air from the collector scroll, the outer boundaries of the scroll and case relative to the axis being closely adjacent and the case extending axially in both directions from the scroll, the case being defined by the compressor casing and shells mounted on and extending from each face of the casing, a combustion liner having a fuel inlet at one end thereof and a combustion products outlet at the other end thereof mounted within the case and extending axially in both directions from the scroll, the scroll discharging into the case through an air inlet directed transversely to the said axis intermediate the ends of the liner, and a fixed baffle extending radially and longitudinally of the case substantially from the liner to the case disposed on the opposite side of the liner from the air inlet to inhibit circumferential flow of air in the space between the casing and liner.

3. A gas turbine combustion chamber comprising a generally cylindrical casing, a flame tube therein extending longitudinally of the casing, a combustion products outlet at one end of the casing, a fuel inlet at the other end of the casing, an air inlet directed substantially radially into the casing intermediate the ends of the casing and of the flame tube, the casing and flame tube defining between them an annular space connecting the air inlet with the entire circumference of the flame tube, and a baffle extending radially and longitudinally of the casing between the casing and flame tube generally opposite to the air inlet to inhibit circumferential swirl of air in the space between the casing and flame tube.

References Cited in the file of this patent

UNITED STATES PATENTS

| | | |
|---|---|---|
| 2,470,184 | Pfenninger | May 17, 1949 |
| 2,601,000 | Nerad | June 17, 1952 |
| 2,746,246 | Valota | May 22, 1956 |
| 2,800,093 | Burg | July 23, 1957 |
| 2,801,518 | Wosika | Aug. 6, 1957 |